US 8,571,053 B2

(12) United States Patent
Rodgers (10) Patent No.: US 8,571,053 B2
(45) Date of Patent: Oct. 29, 2013

(54) METHOD AND SYSTEM FOR ARCHITECTURE OF A FAST PROGRAMMABLE TRANSPORT DEMULTIPLEXER USING DOUBLE BUFFERED APPROACH

(75) Inventor: Stephane W. Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1612 days.

(21) Appl. No.: 11/348,563

(22) Filed: Feb. 7, 2006

(65) Prior Publication Data

US 2006/0268927 A1 Nov. 30, 2006

Related U.S. Application Data

(60) Provisional application No. 60/685,781, filed on May 31, 2005.

(51) Int. Cl.
*H04L 12/54* (2013.01)

(52) U.S. Cl.
USPC .......................................... 370/428

(58) Field of Classification Search
USPC ......... 370/464, 465, 473, 412–428, 429, 351, 370/389, 395.1, 395.7, 395.72; 709/230, 709/232, 233
See application file for complete search history.

(56) References Cited

U.S. PATENT DOCUMENTS

| | | | | |
|---|---|---|---|---|
| 4,473,904 A * | 9/1984 | Suehiro et al. | ................ | 704/221 |
| 5,638,370 A * | 6/1997 | Seconi et al. | ................ | 370/466 |
| 5,646,687 A * | 7/1997 | Botsford et al. | ......... | 375/240.12 |
| 5,719,998 A * | 2/1998 | Ku et al. | ....................... | 704/500 |
| 6,124,866 A * | 9/2000 | Asano et al. | ................ | 345/505 |
| 6,636,222 B1 * | 10/2003 | Valmiki et al. | ................ | 345/505 |
| 6,717,952 B2 | 4/2004 | Jones et al. | | |
| 6,738,846 B1 * | 5/2004 | Slaughter et al. | ............ | 710/260 |
| 6,925,052 B1 * | 8/2005 | Reynolds et al. | ............ | 370/217 |
| 6,999,424 B1 * | 2/2006 | Kovacevic et al. | ........... | 370/252 |
| 7,039,048 B1 * | 5/2006 | Monta et al. | ................. | 370/389 |
| 2003/0028791 A1 * | 2/2003 | Mizobata | ...................... | 713/189 |
| 2003/0043848 A1 * | 3/2003 | Sonksen | ...................... | 370/474 |
| 2004/0208177 A1 * | 10/2004 | Ogawa | ......................... | 370/392 |
| 2005/0008077 A1 * | 1/2005 | Weatherspoon | ......... | 375/240.24 |
| 2005/0015794 A1 | 1/2005 | Roelens | | |
| 2005/0050557 A1 * | 3/2005 | Gabryjelski et al. | ......... | 720/600 |
| 2005/0091057 A1 | 4/2005 | Phillips et al. | | |
| 2005/0132264 A1 * | 6/2005 | Joshi et al. | ................ | 715/500.1 |

* cited by examiner

*Primary Examiner* — Obaidul Huq
(74) *Attorney, Agent, or Firm* — Thomas Horstemeyer, LLP (57) ABSTRACT

A method and system are provided for architecture of a very fast programmable transport demultiplexer using a double-buffered approach. The method may involve utilizing a hardware assist block to process incoming packets, retrieve information about the packets, and write the retrieved information to a memory block. A firmware block may then utilize the information in memory to perform further processing on the packet data. The firmware and hardware assist blocks may work simultaneously so as to speed up the processing of the packet, which can comprise record data and/or audio/video data. The system may comprise the hardware assist block, the firmware assist block, and a memory block.

15 Claims, 7 Drawing Sheets

METHOD AND SYSTEM FOR ARCHITECTURE OF A FAST PROGRAMMABLE TRANSPORT DEMULTIPLEXER USING DOUBLE BUFFERED APPROACH

RELATED APPLICATIONS

The application makes reference to, claims priority to, and claims the benefit of U.S. Provisional Application Ser. No. 60/685,781 filed on May 31, 2005.

This application is related to the following applications, each of which is incorporated herein by reference in its entirety:

U.S. patent application Ser. No. 11/385,468 filed Mar. 21, 2006; and

U.S. patent application Ser. No. 11/328,877 filed Jan. 10, 2006.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the present invention relate to processing video and audio signals. More specifically, certain embodiments of the invention relate to a method and system for transport demultiplexing and architecture of a very fast programmable transport demultiplexer using double buffered approach.

BACKGROUND OF THE INVENTION

In a video system, a stream of data generally comprises many sub-channels, some of which go to video/audio decoders, and some of which may be recorded to memory for PVR applications. Video systems need to have the ability to extract and parse multiple sub-channels, usually in MPEG-2 format. However, with the explosion of the different input formats and higher bit rates, conventional systems may no longer be capable of functioning effectively and efficiently enough to provide the required functionality.

For example, conventional systems may not be adapted to receive a plurality of video streams encoded in different video standards, demultiplex one or more video streams and/or sub-streams, or achieve high video processing speeds as needed by modern video systems. As a result conventional systems are no longer capable of providing the rapid processing that is desirable in ensuring efficiency and effective processing of data streams in the advanced video systems. Different engines may be needed for each type of data, which creates system inflexibilities and complexities, and large system costs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for architecture of a very fast programmable transport demultiplexer using double buffered approach, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to processing video and audio signals. Certain embodiments of the invention relate to a method and system for transport demultiplexing and architecture of a very fast programmable transport demultiplexer using double buffered approach.

Modern transport demultiplexers may be required to perform a wide variety of tasks to be able to deal with the different input formats. Modern transport demultiplexers may, therefore, handle a large number of parsing formats, demultiplex several sub-streams from within a large number of multiplexed streams, and provide a host of other functions.

In video systems it may be desirable to support certain functions that may be handled by modern transport demultiplexers. Such functions may include, for example, receiving several streams which have been multiplexed together, and separate out whole streams or sub-streams at user discretion; parsing input formats such as, for example, MPEG Transport, Directv Transport, raw PES, DVD, raw ES, and a variety of other formats; recognizing start code or frame synchronization patterns from several different ES layers; assisting in the frame synchronization for video and audio; providing ancillary information about the incoming data to assist the downstream audio or video decoders; providing timestamp management support; providing methods for synchronizing commands from software with the data stream; providing flexibility to support new, as-yet unanticipated formats, and being able to do all of the aforementioned functions at high speeds such as, for example, 200+ Mbits/sec. In this regard, a fast yet programmable solution may be desirable. Such a solution may utilize a double buffer and/or a hardware assist and may be implemented in a record audio video engine (RAVE).

Figure 1A:
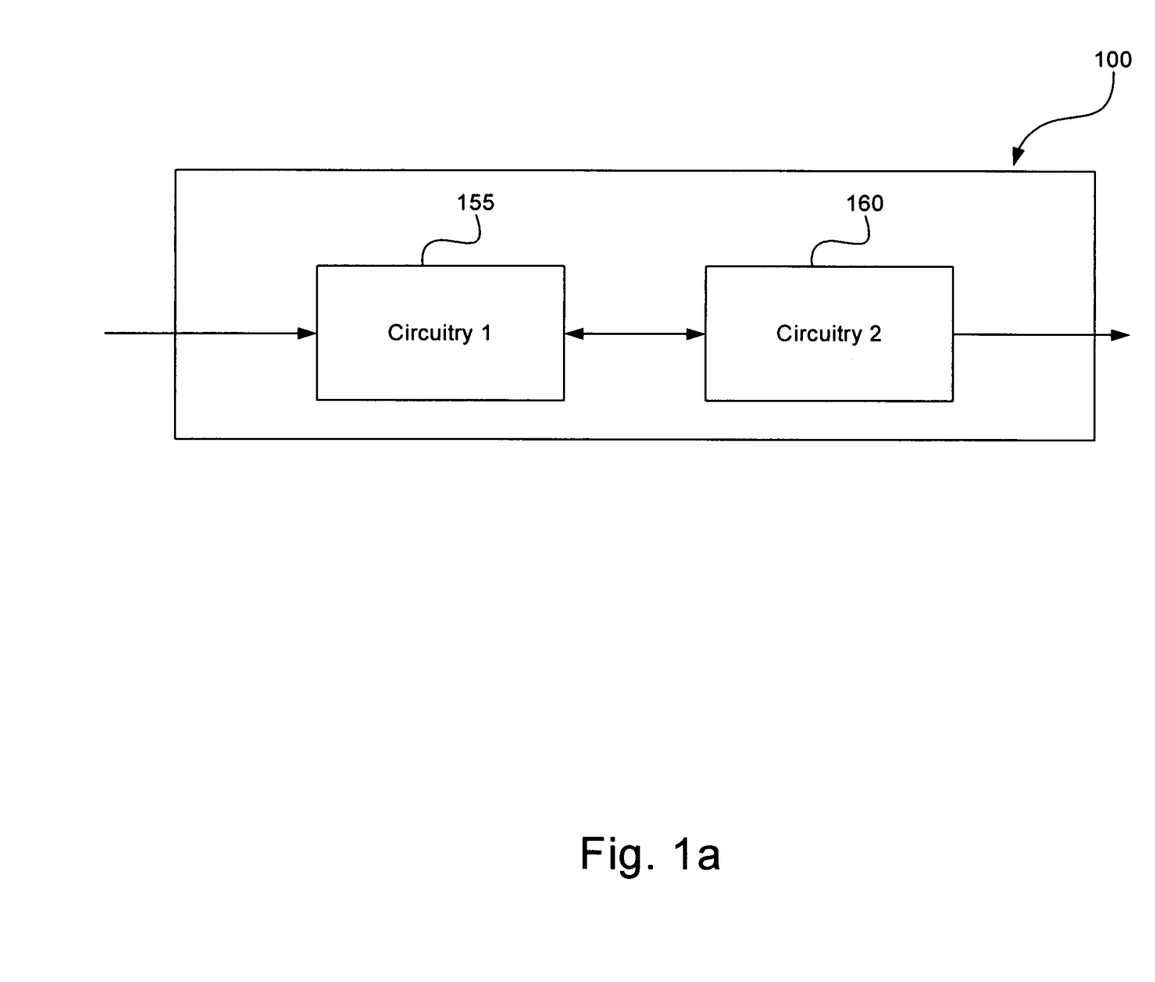
FIG. 1a illustrates a block diagram of exemplary architecture of a system, in accordance with an embodiment of the present invention.

FIG. 1a illustrates a block diagram of exemplary architecture of a system 100, in accordance with an embodiment of the present invention. The system 100 may comprise a first circuitry 155 and a second circuitry 160. The system 100 may process incoming packets, where the first circuitry 155 may partially process a portion of a first packet, resulting in a partially processed first packet. The second circuitry 160 may execute a set of instructions to process the remainder of the partially processed first packet. The first circuitry 155 may partially process a second packet while the second circuitry 160 is processing the remainder of the first packet. When the second circuitry 160 completes processing the first packet, the second circuitry 160 may begin processing the remainder of the partially processed second packet, and at the same time, the first circuitry 155 may partially process a third packet. The processing may continue where the first circuitry 155 partially processes a packet, while the second circuitry 160 processes the remainder of the partially processed previous packet.

In an embodiment of the present invention, a RAVE may support multiple decoders that support audio and/or video decoding. The RAVE may also provide PVR functions such as, for example, data record, while simultaneously supplying ancillary information to the host software, which may enable it to manage PVR playback and storage to disk. Therefore, the RAVE may be a block that combines record functionalities and the audio/video decoding functions. The RAVE may be capable of processing data associated with each of the video decoding, audio decoding, and the record functions. The RAVE may be designed such that it may provide flexibility to allow for subsequent algorithmic changes as may be needed by data format changes, for example. Additionally, the RAVE may maintain a high throughput.

Figure 1B:
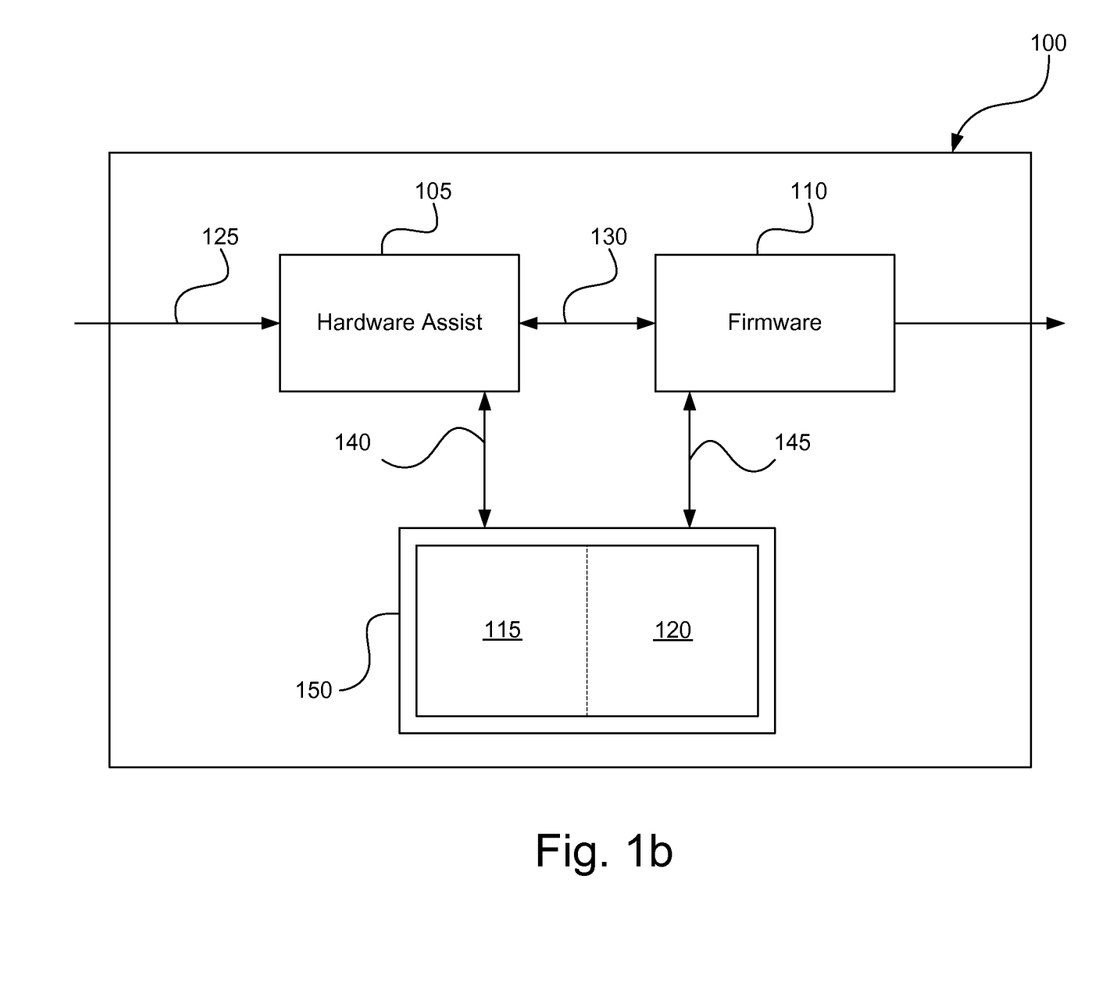
FIG. 1b illustrates a block diagram of exemplary architecture of a system, in accordance with an embodiment of the present invention.

FIG. 1b illustrates a block diagram of exemplary architecture of a system 100, in accordance with an embodiment of the present invention. The RAVE 100 may comprise a hardware assist block 105, a firmware block 110, and a memory block 150. The input 125 may comprise input data, where the input data may comprise packets of video, audio, and record data in any number of formats. The hardware assist block 105 may then perform some processes and pass processed data to firmware block 110, either directly via data path 130 or indirectly via the buffer block 150. A portion of the processed data may be passed from the hardware assist block 105 via data path 140 to the memory block 150, which may then be accessed by the firmware block 110 via data path 145.

Several schemes may be utilized for interfacing the hardware assist block 105 with the firmware block 110. To increase flexibility and allow for subsequent algorithmic changes, and to maintain high throughput, one or more schemes may be utilized within a RAVE. Using the combination of hardware assist and firmware, the RAVE may provide the flexibility associated with programmability of firmware, and the speed associated with hardware. The hardware assist 105 and the firmware 110 may be interfaced such that speed and programmability may be maintained simultaneously.

In one embodiment of the present invention, one approach may be to have the incoming packets 125 examined by both the hardware assist 105 and the firmware 110. The hardware assist 105 may provide signals comprising information regarding each byte of the incoming packet 125 as they are received. The information may indicate, for example, the type of byte or the location of the byte, such as, for example, the location of frame synchronization patterns, etc. The firmware 110 may then read the signals provided by the hardware assist 105 and based on the received signals make a decision as to whether the received byte is to be processed using functions available in the firmware 110 or other algorithms.

For example, as a packet comes in, the hardware assist 105 may examine the data, and may look for a data pattern. When the hardware assist 105 sees the pattern it may send a trigger signal to the firmware 110. The trigger signal may be, for example, an interrupt. The firmware 110 may then use the interrupt to begin a process associated with the identified pattern.

In one embodiment of the present invention, another approach may be for the hardware assist 105 to perform major functions, and allow for certain functions to be performed by the firmware 110. The hardware assist 105 may process a portion of the incoming packets 125 and the firmware 110 may process the remaining portion of the incoming packets 125.

In one embodiment of the present invention, the hardware assist 105 may perform major functions, or portions thereof. The functions associated with incoming packets 125 may be broken down into sub-functions. The hardware assist 105 may perform major functions and/or sub-functions. The firmware 110 may perform a remaining portion of the functions and/or sub-functions.

In one embodiment of the present invention, the hardware assist 105 may operate on an incoming packet 125, and may output data regarding the processed data. The output data and the packets may be stored in the memory block 150. During the next packet time, i.e., when the next incoming packet is being processed by the hardware assist 105, the firmware 110 may retrieve and process the previous packet and associated data from the memory block 150.

In another embodiment of the present invention, the hardware assist 105 may process functions that may be less likely to change such as, for example, MPEG parsing, and the firmware 110 may make most or all of the final decisions of the RAVE 100. Functions that may change as a result of, for example, a new data format may be processed mainly by the firmware 110 with some processing that may be done by the hardware assist 105.

A current packet, packet A, may come into the RAVE 100 via input 125. The hardware assist 105 may perform a portion of the functions associated with the processing of packet A, and may retrieve information associated with packet A as well. The hardware assist 105 may then set up the hardware assist fields and may write retrieved information to a location in the memory block 150 such as, for example, a buffer 115. The hardware assist field may comprise, for example, address of compare pattern, compare patterns, start/end of PES headers, number of ES bytes in the packet, number of payload bytes in the packet, start of payload, presence of packet errors, type of packet (record or audio/video), etc. These fields and their uses are explored further in U.S. patent application Ser. No. 11/385,468 filed Mar. 21, 2006, and U.S. patent application Ser. No. 11/328,877 filed Jan. 10, 2006. Accordingly, each of U.S. patent application Ser. No. 11/385,468 filed Mar. 21, 2006, and U.S. patent application Ser. No. 11/328,877 filed Jan. 10, 2006, is incorporated herein by reference in its entirety.

After the hardware assist 105 performs the portion of the functions assisted with the first packet A, the firmware 110 may then access and begin processing the data associated with the first packet A from the buffer 115, and output the processed data A. Meanwhile, while the firmware 110 is processing the previously received first packet A, the hardware assist 105 may process packet B (a second packet) and write the associated retrieved data in another location in the memory block 150 such as, for example, a buffer 120. The firmware 110 may then begin processing the packet B from the buffer 120, and the hardware assist 105 may process the next packet C (a third packet) and write the associated information in the buffer 115, overwriting the data associated with the packet A previously processed by the firmware 110.

Figure 2:
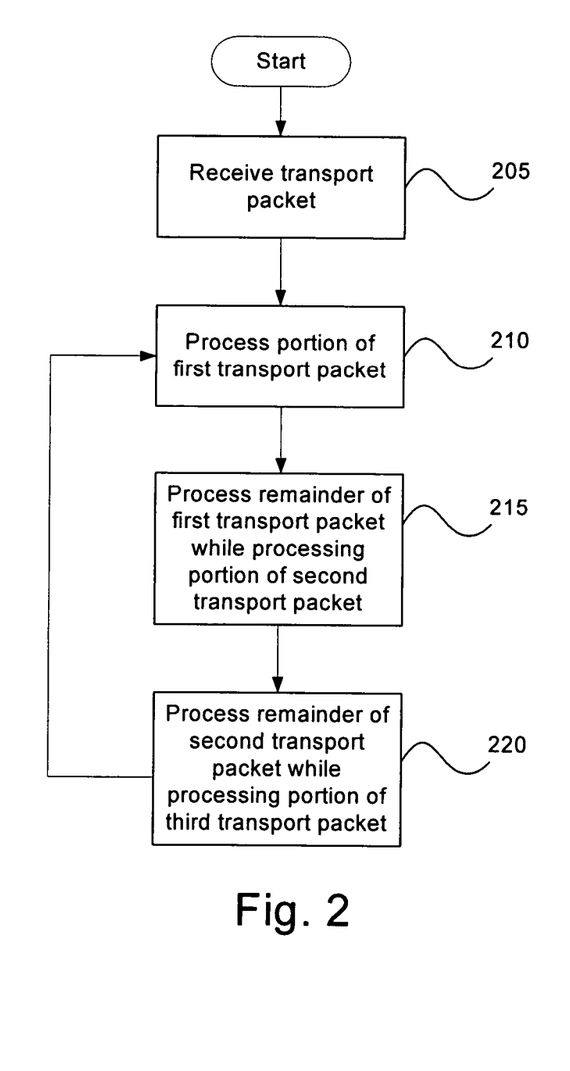
FIG. 2 illustrates a flow diagram of an exemplary method of a programmable transport demultiplexer using a double-buffered approach, in accordance with an embodiment of the present invention.

FIG. 2 illustrates a flow diagram of an exemplary method of a programmable transport demultiplexer using a double-buffered approach, in accordance with an embodiment of the present invention. The programmable transport demultiplexer may be utilized in the RAVE 100 of FIG. 1. At 205 a first packet may be received. A portion of the first packet may then be processed by the hardware assist at 210. The hardware assist may retrieve from the first packet information to set up hardware assist fields. The hardware assist may also retrieve from the first packet information that may be utilized by the firmware and write such information to a first buffer.

At a next block 215, the firmware may access the information from the first buffer and process the remainder of the partially processed first packet. Meanwhile, while the firmware is processing the data from the first packet at 210, a second packet may be received at block 205, and the hardware assist may process a portion of the second packet at 215. The hardware assist may retrieve from the second packet information to set up hardware assist fields. The hardware assist may also retrieve from the second packet information that may be utilized by the firmware and write such information to a second buffer.

At a next block 220, the firmware may access the information from the second buffer and process the remainder of the partially processed second packet. Meanwhile, while the firmware is processing the data from the second packet at 215, a third packet may be received at block 205, and the hardware assist may process a portion of the third packet at 220. The hardware assist may retrieve from the third packet information to set up hardware assist fields. The hardware assist may also retrieve from the third packet information that may be utilized by the firmware and write such information to the first buffer.

The same steps may then be repeated for all packets received at a block 205, where the hardware assist may partially process one packet while the firmware is processing the remained of the previously partially processed packet.

Figure 3A:
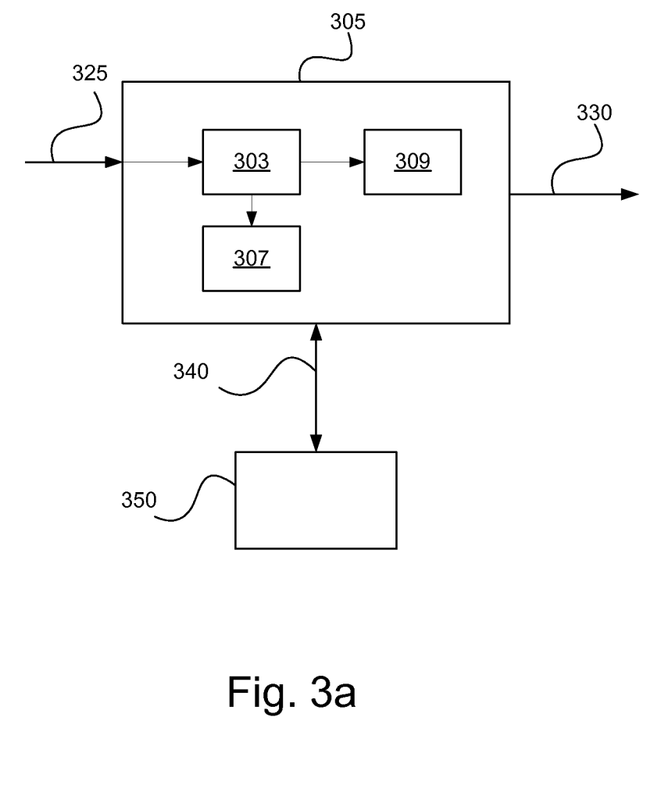
FIG. 3a illustrates a block diagram of an exemplary architecture of hardware assist 105, in accordance with an embodiment of the present invention.

FIG. 3a illustrates a block diagram of an exemplary architecture of hardware assist 105, in accordance with an embodiment of the present invention. The hardware assist 105 may receive a current packet, via input 325. The hardware assist 305 may comprise, for example, logic units 303, 307, and 309. The logic unit 303 may receive the received packet and may determine whether the packet is to be routed to an audio or video decoder, or to a record application.

The hardware assist 305 may then process the packet. Based on the determined format, logic units 307 and 309 of the hardware assist 305 may set up hardware assist fields in a memory block 350. The fields may be set up such that the fields are generic and independent of the type of data in the packet. The logic units 307 and 309 may also extract information associated with the packet. The extracted information may then be written to the memory block 350. The logic units 307, 309 may then write the extracted information in a way that is independent of the format or type of data of the packet. As a result, the RAVE may be capable of processing different types of record and audio/video data and the processing by the firmware does not have to be influenced by the format of the data of the packet.

The hardware assist fields may comprise, for example, address of compare pattern, compare patterns, start/end address of PES headers, number of ES bytes in the packet, number of payload bytes in the packet, start of payload, presence of packet errors, type of packet (record or audio/video), etc. These fields and their uses are explored further in U.S. patent application Ser. No. 11/385,468 filed Mar. 21, 2006 and U.S. patent application Ser. No. 11/328,877 filed Jan. 10, 2006. Accordingly, each of U.S. patent application Ser. No. 11/385,468 filed Mar. 21, 2006, and U.S. patent application Ser. No. 11/328,877 filed Jan. 10, 2006, is incorporated herein by reference in its entirety.

Figure 3B:
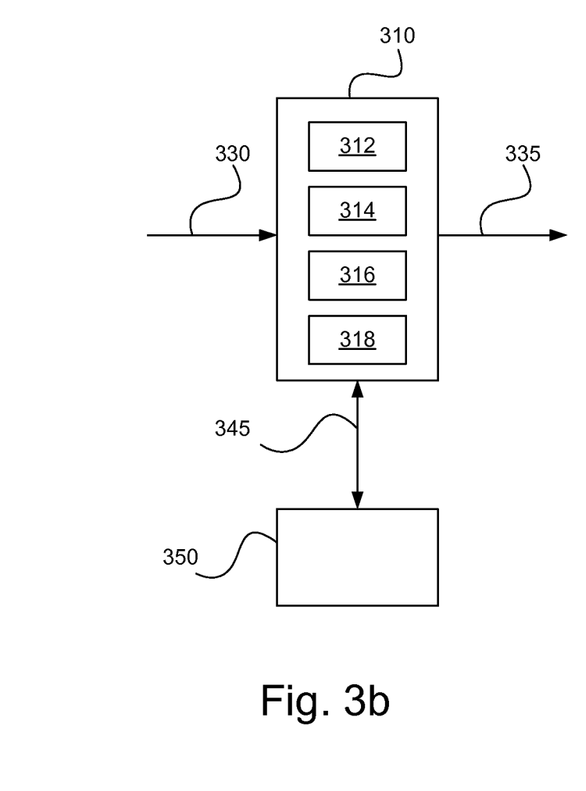
FIG. 3b illustrates a block diagram of exemplary processes of firmware 110, in accordance with an embodiment of the present invention.

FIG. 3b illustrates a block diagram of exemplary processes of firmware 110, in accordance with an embodiment of the present invention. The hardware assist 105 may complete processing of a packet, by setting up the hardware assist fields and other information relevant to the firmware processing of the packet. The hardware assist 305 may write the hardware assist fields and other information to the memory block 350. The firmware 110 may then access and begin processing the data associated with the packet from the memory block 350. The firmware 110 does not have to distinguish the format or data type associated with the packet, because the hardware assist fields written by the hardware assist 305 are independent of the format of the input packet. The firmware 310 may perform functions associated with processing the packets such as, for example, record processes, audio decoding, video decoding, to name a few. While the firmware 310 may be processing data associated with a first packet, the hardware 305 may process the next incoming packet and write the associated retrieved data in another location in the memory block 350.

The firmware 110 may comprise functions 312 for processing record data, functions 314 for processing audio data, functions 316 for processing video data, and other functions 318 that may be processed in association with any packet. The firmware 110 may output the processed data 335, which may be retrieved by the appropriate circuitry for further processing or display.

Figure 4:
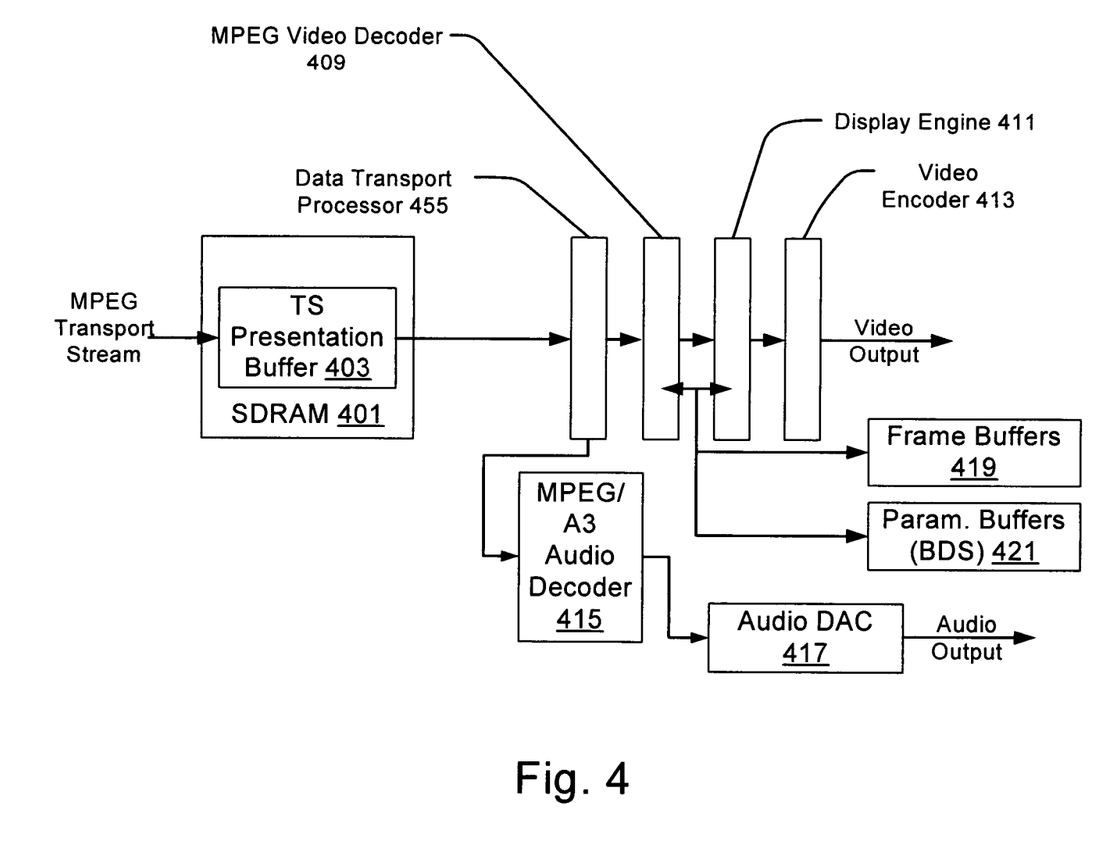
FIG. 4 illustrates a block diagram of an exemplary circuit for decoding compressed video data, in accordance with an embodiment of the present invention.

FIG. 4 illustrates a block diagram of an exemplary circuit for decoding compressed video data, in accordance with an embodiment of the present invention. Data may be received and stored in a buffer 403 within a Synchronous Dynamic Random Access Memory (SDRAM) 401. The data may be received from either a communication channel or from a local memory, such as, for example, a hard disc or a DVD.

The data output from the buffer 403 may then be passed to a data transport processor 405. The data transport processor 405 may demultiplex the stream into individual channels, and pass the audio elementary stream to an audio decoder 415 and the video elementary stream to a video decoder 409, for example. The audio data may then be sent to the output blocks, and the video may be sent to a display engine 411. In certain embodiments of the present invention, the data transport processor 405 may comprise the RAVE. In an embodiment of the present invention, the stream may comprise record data, and audio/video data. The decoding circuit may also comprise a display engine 411, and a video encoder 413. Additionally, decoded images may be buffered in frame buffers 419.

Figure 5:
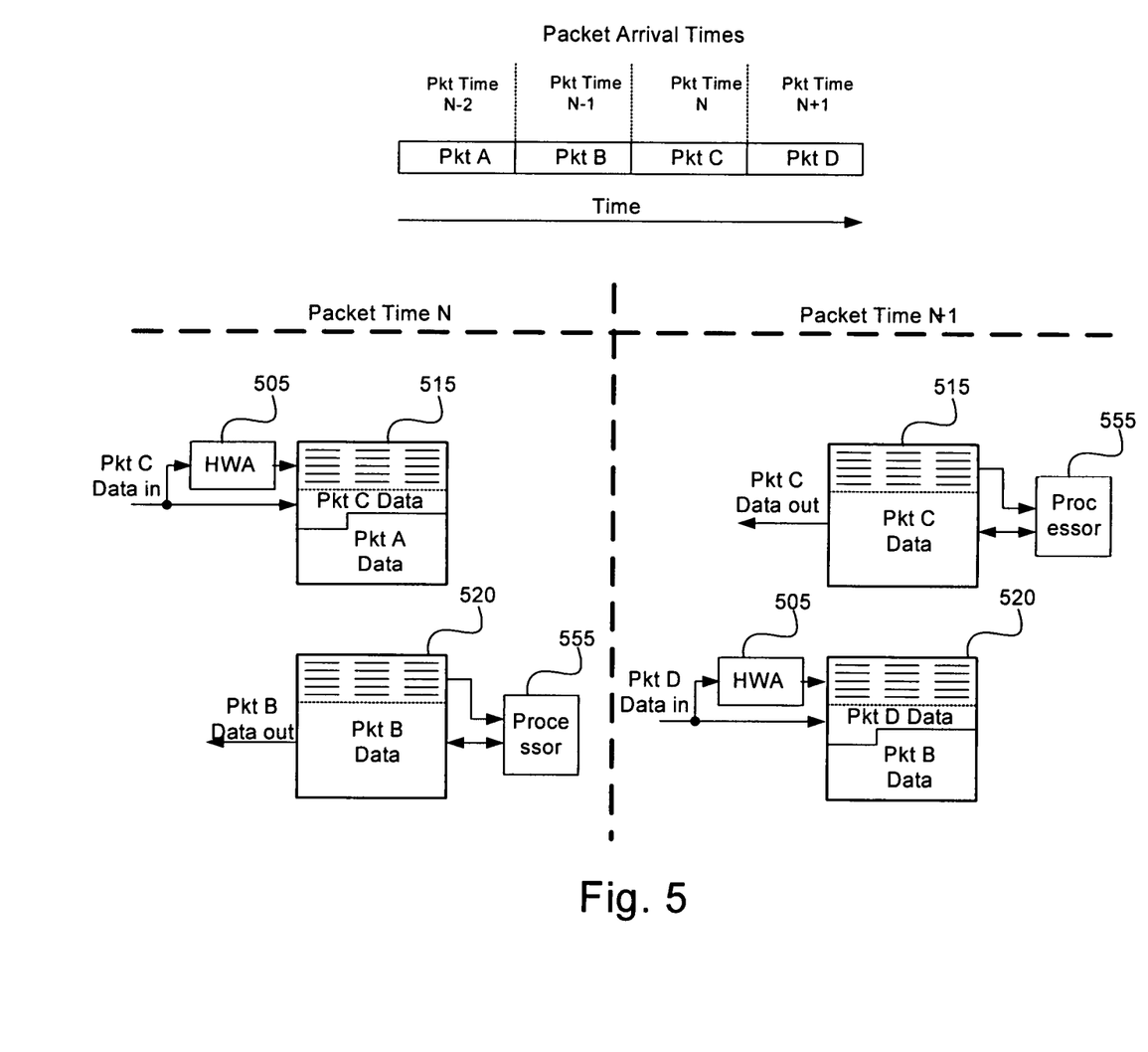
FIG. 5 illustrates an exemplary layout of memory buffers during packet processing by a RAVE, in accordance with an embodiment of the present invention.

FIG. 5 illustrates an exemplary layout of memory buffers during packet processing by a RAVE, in accordance with an embodiment of the present invention. At a time N−2, a first packet A may be received by the RAVE via hardware assist

505. The hardware assist 505 may operate on the packet A and write the data associated with packet A into a memory buffer 515. At a next time N−1, a second packet B may be received by the RAVE via hardware assist 505. The hardware assist 505 may operate on the packet B and write the data associated with packet B into a memory buffer 520. At the same time, during time N−1, the firmware via the processor 555 may access and process packet A data from memory buffer 515. The processed packet A data may then be output.

At a next time N, a third packet C may be received by the RAVE via hardware assist 505. The hardware assist 505 may operate on the packet C and write the data associated with packet C into a memory buffer 515. By time frame N, the processor may have completed processing packet A data, which was written in the memory buffer 515. Therefore, when the hardware assist 505 writes packet C data into memory buffer 515, it replaces packet A data. At the same time, during time N, the firmware via the processor 555 may access and process packet B data from memory buffer 520. The processed packet B data may then be output.

At a next time N+1, a fourth packet D may be received by the RAVE via hardware assist 505. The hardware assist 505 may operate on the packet D and write the data associated with packet D into a memory buffer 520. By time frame N+1, the processor may have completed processing packet B data, which was written in the memory buffer 520. Therefore, when the hardware assist 505 writes packet D data into memory buffer 520, it replaces packet B data. At the same time, during time N+1, the firmware via the processor 555 may access and process packet C data from memory buffer 515. The processed packet C data may then be output. And the process may continue as such, as long as packets continue on being received by the RAVE.

In an embodiment of the present invention, when the hardware assist 505 processes a received packet, the result data may be a partially processed packet. The hardware assist 505 may write the processed data associated with the packet into memory, in addition to the packet itself. Therefore, the firmware may have access to the packet while processing it using the processed data associated with the packet.

Figure 6:
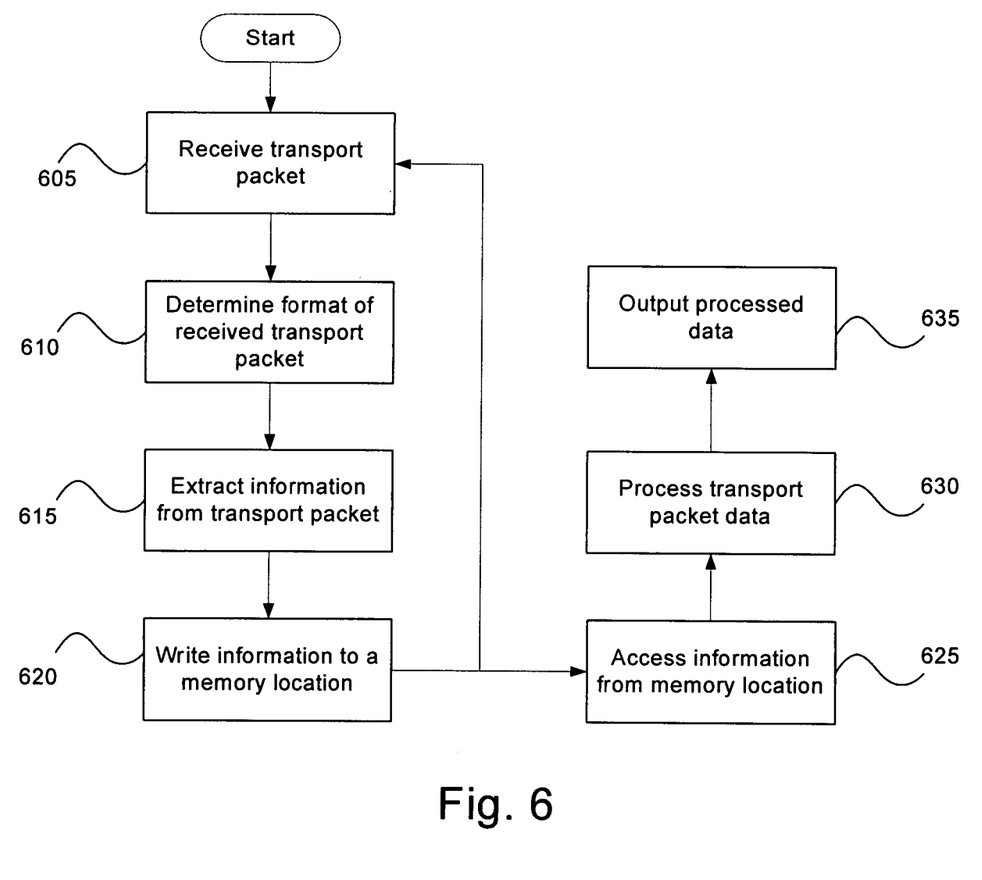
FIG. 6 illustrates a flow diagram of an exemplary method of a programmable transport demultiplexer using a double-buffered approach, in accordance with an embodiment of the present invention.

FIG. 6 illustrates a flow diagram of an exemplary method of a programmable transport demultiplexer using a double-buffered approach, in accordance with an embodiment of the present invention. The programmable transport demultiplexer may be utilized in the RAVE 100 of FIG. 1. At an initial block 605 a current packet may be received by the hardware assist 105 of FIG. 1. The hardware assist may then determine the format of the received current packet at a next block 610. For example, the current packet may comprise record data, audio data, or video data. Additionally, the current packet may be packetized in a specific format using one of a variety of techniques. For example, in the case of the audio or video data, different compressions schemes such as, for example, MPEG-2 or MPEG-4 may be utilized. Depending on the format of the packet, the frame synchronization patterns may take on different values and have different meanings, and the amount of parsing to extract an associated ES layer may be different. The hardware assist may then, at a next block 615, extract information regarding the current packet. The information may be, for example, hardware assist fields. The hardware assist may be able to locate the information within the current packet based on the format of the current packet. The hardware assist may retrieve from the current packet information to set up hardware assist fields. The hardware assist may also retrieve from the current packet information that may be utilized by the firmware.

The hardware assist fields may comprise, for example, address of compare pattern, compare patterns, start/end of PES headers, number of ES bytes in the packet, number of payload bytes in the packet, start of payload, presence of packet errors, type of packet (record or audio/video), etc. These fields and their uses are explored further in U.S. patent application Ser. No. 11/385,468 filed Mar. 21, 2006, and U.S. patent application Ser. No. 11/328,877 filed Jan. 10, 2006. Accordingly, each of U.S. patent application Ser. No. 11/385,468 filed Mar. 21, 2006, and U.S. patent application Ser. No. 11/328,877 filed Jan. 10, 2006 is incorporated herein by reference in its entirety.

At a next block 620, the hardware assist may write the retrieved information about the current packet into a memory location such as, for example, a first buffer. In addition to the retrieved information, the hardware assist may also write the current packet to the first buffer. Hence, the first buffer may have stored therein the current packet, in addition to information retrieved about the current packet.

The firmware, at a next block 625, may access the information from the first buffer such as, for example, the information extracted by the hardware assist and the data packet itself. At the same time, when the firmware begins processing the information associated with the current packet, a next packet may be received at block 605, and the hardware assist may process the next packet, while the firmware processes the current packet.

At a next block 630, the firmware may process the current packet according to the appropriate processing associated with the current packet. For example, a packet comprising record data may be processed to yield record data for video playback; whereas packets comprising audio/video data may be processed to be decoded and displayed. The firmware may then output the processed data of the current packet at a next block 635.

While the firmware is processing the data from the current packet, the next packet may be received at block 605, and the hardware assist may retrieve information and set up hardware assist fields from the next packet and write such information to a second memory location such as, for example, a second buffer. When the firmware accesses the next packet from the second memory location, the hardware assist may receive the following packet. Since the firmware has completed processing the packet that was written to the first memory location, the most recent packet may be written into the first memory location. As a result, the hardware assist alternates the memory locations when writing the retrieved information associated with a packet. Therefore, the hardware assist and firmware can process data simultaneously, while the firmware may be processing a packet, the hardware assist may be processing the following packet. The method may continue where the hardware may process received packets while the firmware may be processing the previous packet.

The hardware assist fields may be set up such that they may be generic and independent of the type of data in the packet. As a result, the RAVE may be capable of processing different types of record and audio/video data and the processing by the firmware may not be influenced by the format of the data of the packet, and as a result the same code in the firmware may be used to process data regardless of the format of the associated packet.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing a plurality of packets, said system comprising:
a first circuit configured to extract information regarding a first packet during a first packet time, the first circuit being further configured to process a portion of said first packet during said first packet time to generate a partially processed first packet by determining a format associated with the first packet, wherein the first circuit is configured to extract the information regarding the first packet based on the format of the first packet and writing the extracted information regarding the first packet to a memory, wherein the extracted information is written to said memory in a format that is independent of the format associated with the packet with which it is associated; and
a second circuit configured to retrieve the extracted information and process said partially processed first packet based on said extracted information while the first circuit processes a portion of a second packet during a second packet time to generate a partially processed second packet, said second circuit being further configured to process the partially processed second packet while the first circuit processes a portion of a third packet during a third packet time to generate a partially processed third packet, said first, second, and third packets comprising audio and video data.

2. The system according to claim 1, further comprising:
a first memory for storing the partially processed first packet;
a second memory for storing the partially processed second packet; and
wherein the first memory stores the partially processed third packet by overwriting the partially processed first packet.

3. The system according to claim 1, wherein processing the partially processed first packet comprises:
reading information regarding the first packet from the memory; and
outputting the processed first packet.

4. The system according to claim 1, wherein the second circuit includes firmware.

5. The system according to claim 1, wherein the second circuit comprises a processor.

6. The system according to claim 1, wherein said plurality of packets comprises at least one of: transport packets, fixed length portions of raw PES or ES data, and arbitrarily formatted data.

7. A method for processing a plurality of packets, said method comprising:
processing, by a first circuit, a portion of a first packet during a first packet time to generate a partially processed first packet, wherein processing the portion of the first packet comprises:
determining a format associated with the first packet;
extracting information regarding the first packet based on the format of the first packet; and
writing the extracted information regarding the first packet to a memory, wherein the extracted information is written to the memory in a format that is independent of the format associated with the packet with which it is associated; and
responsive to receiving a trigger from the first circuit, processing, by a second circuit, said partially processed first packet while said portion of said second packet is being processed by said first circuit during a second packet time to generate a partially processed second packet, and
processing the partially processed second packet by the first circuit while the second circuit processes a portion of a third packet during a third packet time to generate a partially processed third packet, wherein said first, second, and third packets comprise audio and video data.

8. The method according to claim 7, further comprising:
storing the partially processed first packet in a first memory;
storing the partially processed second packet in a second memory; and
wherein the first memory stores the partially processed third packet by overwriting the partially processed first packet.

9. The method according to claim 7, wherein processing the partially processed first packet comprises:
reading information regarding the first packet from the memory;
processing the partially processed first packet using the information; and
outputting the processed first packet.

10. The method according to claim 7, wherein firmware comprises said plurality of instructions.

11. The method according to claim 7, wherein a processor executes a plurality of instructions to process said plurality of packets.

12. The method according to claim 7, wherein said plurality of packets comprises at least one of: transport packets, fixed length portions of raw PES or ES data, and arbitrarily formatted data.

13. A method comprising:
receiving audio and video data packets comprising first and second data packets;
partially processing a first portion of said first data packet by a first circuitry to generate a partially processed first data packet, said first partially processing comprising retrieving first information from said first data packet, wherein said first circuitry is configured to set up at least one field for assisting said second circuitry, wherein said at least one field comprises at least one of: a start/end address of packetized elementary stream (PES) headers, number of elementary stream (ES) bytes in a packet, number of payload bytes in said first packet and said second packet, start of a payload, presence of packet errors, and type of packet;

writing said first information into a first location in a buffer memory, said partially processing and said writing being performed during a first packet time;

responsive to identifying predetermined data within said first data packet by said first circuitry, processing a remainder portion of said partially processed first data packet by said second circuitry using said first information while said first circuitry partially processes a first portion of a second data packet to generate a partially processed second data packet, said second partially processing of said second data packet comprising retrieving second information from said second data packet;

writing said second information into a second location in said buffer memory, said partially processing and said writing of said second packet being performed during a second packet time;

accessing said second information from said second location by said second circuitry; and processing a remainder portion of said partially processed second data packet by said second circuitry using said second information.

14. A method comprising:

receiving audio and video data packets comprising first and second data packets;

partially processing a first portion of said first data packet by a first circuitry to generate a partially processed first data packet, said partially processing comprising retrieving first information from said first data packet;

writing said first information into a first location in a buffer memory, said partially processing and said first writing being performed during a first packet time;

responsive to identifying predetermined data within said first data packet by said first circuitry, processing a remainder portion of said partially processed first data packet by said second circuitry using said first information while said first circuitry partially processes a first portion of a second data packet to generate a partially processed second data packet, said partially processing of said second data packet comprising retrieving second information from said second data packet;

writing said second information into a second location in said buffer memory, said partially processing and second writing of said second packet being performed during a second packet time;

accessing said second information from said second location by said second circuitry; and processing a remainder portion of said partially processed second data packet by said second circuitry using said second information, wherein said first circuitry is configured to set up at least one field for assisting said second circuitry, wherein said at least one field comprises a start/end address of packetized elementary stream (PES) headers, number of elementary stream (ES) bytes in a packet, number of payload bytes in a packet, start of a payload, and type of packet.

15. A system for processing a plurality of packets, said system comprising:

a first circuit configured to partially process a first packet during a first packet time and write information corresponding to the first packet to a first memory location, wherein said first circuit is further configured to set at least one field for assisting said second circuit, wherein said at least one field comprise at least one of: a start/end address of packetized elementary stream (PES) headers, number of elementary stream (ES) bytes in a packet, number of payload bytes in a packet, start of a payload, presence of packet errors, or type of packet; and a second circuit process the partially processed first packet based on the information corresponding to the first packet while the first circuit partially processes a second packet during a second packet time and writes information corresponding to the second packet to a second memory location, the second circuit being further configured to process the partially processed second packet while the first circuit processes a portion of a third packet during a third packet time and writes information corresponding to the third packet to the first memory location and overwrites the information corresponding to the first packet.

* * * * *